United States Patent
Lee et al.

(10) Patent No.: US 12,238,566 B2
(45) Date of Patent: Feb. 25, 2025

(54) APPARATUS AND METHOD FOR PSA-UPF RELOCATION IN WIRELESS COMMUNICATION SYSTEM

(71) Applicant: Samsung Electronics Co., Ltd., Suwon-si (KR)

(72) Inventors: Jicheol Lee, Suwon-si (KR); Sunghoon Kim, Suwon-si (KR); Hyesung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/761,580

(22) PCT Filed: Sep. 17, 2020

(86) PCT No.: PCT/KR2020/012577
§ 371 (c)(1),
(2) Date: Mar. 17, 2022

(87) PCT Pub. No.: WO2021/054747
PCT Pub. Date: Mar. 25, 2021

(65) Prior Publication Data
US 2022/0345929 A1    Oct. 27, 2022

(30) Foreign Application Priority Data
Sep. 17, 2019    (KR) .................. 10-2019-0114341

(51) Int. Cl.
*H04W 28/02*    (2009.01)
*H04L 12/14*    (2006.01)
(Continued)

(52) U.S. Cl.
CPC ..... *H04W 28/0236* (2013.01); *H04L 12/1407* (2013.01); *H04L 41/0813* (2013.01); *H04L 67/14* (2013.01); *H04W 28/0268* (2013.01)

(58) Field of Classification Search
None
See application file for complete search history.

(56) References Cited

U.S. PATENT DOCUMENTS 10,285,155 B1 *    5/2019   Dodd-Noble ......... H04W 4/029
10,419,980 B2 *    9/2019   Lee .................. H04W 36/0011
(Continued)

FOREIGN PATENT DOCUMENTS

KR    10-2005-0062330 A    6/2005
KR    10-2011-0068797 A    6/2011
(Continued)

OTHER PUBLICATIONS

U.S. Appl. No. 62/827,608, filed Apr. 1, 2019, Godin et al., "Benchmarking of Delay Estimates in a 5G Network for QoS Flow Setup and Monitoring"; Background.*
(Continued)

*Primary Examiner* — Gregory B Sefcheck

(57) ABSTRACT

The present disclosure relates to a $5^{th}$ generation (5G) or pre-5G communication system for supporting a data transmission rate higher than that of a $4^{th}$ generation (4G) communication system such as long-term evolution (LTE). According to various embodiments of the present disclosure, provided is a method for operating a network node such as an application function (AF) node in a wireless communication system, the method comprising the steps of: generating an AF request including information related to one or more data path latencies; and transmitting the information related to the one or more data path latencies to a session management function (SMF) node through a network exposure function (NEF) node.

12 Claims, 11 Drawing Sheets

(51) Int. Cl.
*H04L 41/0813* (2022.01)
*H04L 67/14* (2022.01)

(56) References Cited

U.S. PATENT DOCUMENTS

| | | | |
|---|---|---|---|
| 2005/0136980 A1 | 6/2005 | Kim et al. | |
| 2009/0023437 A1* | 1/2009 | Cairns | H04L 25/0242 |
| | | | 455/422.1 |
| 2010/0027509 A1* | 2/2010 | Velev | H04W 8/082 |
| | | | 370/331 |
| 2011/0142177 A1 | 6/2011 | Kang et al. | |
| 2015/0156045 A1 | 6/2015 | Lee et al. | |
| 2018/0192390 A1 | 7/2018 | Li et al. | |
| 2018/0199398 A1* | 7/2018 | Dao | H04W 76/34 |
| 2018/0227743 A1* | 8/2018 | Faccin | H04W 8/08 |
| 2018/0270715 A1* | 9/2018 | Lee | H04W 36/0011 |
| 2018/0279180 A1 | 9/2018 | Lee et al. | |
| 2019/0007500 A1* | 1/2019 | Kim | H04L 67/141 |
| 2019/0053117 A1* | 2/2019 | Bae | H04W 76/30 |
| 2019/0059067 A1* | 2/2019 | Lee | H04L 67/141 |
| 2019/0357301 A1* | 11/2019 | Li | H04W 80/10 |
| 2020/0107213 A1* | 4/2020 | Park | H04W 4/24 |
| 2020/0314686 A1* | 10/2020 | Godin | H04W 24/08 |
| 2020/0336947 A1 | 10/2020 | Lee et al. | |
| 2020/0374323 A1* | 11/2020 | Zhang | H04L 67/131 |
| 2020/0404724 A1* | 12/2020 | Pedersen | H04B 7/0632 |
| 2021/0099943 A1* | 4/2021 | Dannebro | H04L 67/63 |
| 2021/0168584 A1* | 6/2021 | Li | H04W 48/20 |
| 2021/0204162 A1* | 7/2021 | Chunduri | H04W 28/0992 |
| 2021/0219357 A1* | 7/2021 | Talebi Fard | H04W 48/16 |
| 2021/0243640 A1* | 8/2021 | Hoffmann | H04L 41/0816 |
| 2021/0243826 A1* | 8/2021 | Hoffmann | H04W 68/005 |
| 2021/0314220 A1* | 10/2021 | Chou | H04W 24/02 |
| 2022/0007180 A1* | 1/2022 | Liao | H04W 12/06 |
| 2022/0021623 A1* | 1/2022 | Liu | H04L 47/27 |
| 2022/0191292 A1* | 6/2022 | Skubic | H04L 67/52 |
| 2022/0322202 A1* | 10/2022 | Li | H04M 15/8016 |
| 2022/0345929 A1* | 10/2022 | Lee | H04L 43/0852 |

FOREIGN PATENT DOCUMENTS

| | | |
|---|---|---|
| KR | 10-2015-0009082 A | 1/2015 |
| KR | 10-2015-0064595 | 6/2015 |
| KR | 10-2018-0123364 | 11/2018 |
| KR | 20190044661 A | 4/2019 |

OTHER PUBLICATIONS

International Search Report and Written Opinion of the International Searching Authority dated Jan. 19, 2021, in connection with International Application No. PCT/KR2020/012577, 9 pages.
3GPP TS 23.502 V16.1.0 (Jun. 2019), Technical Specification, 3rd Generation Partnership Project; Technical Specification Group Services and System Aspects; Procedures for the 5G System; Stage 2 (Release 16), Jun. 2019, 499 pages.
Samsung, "KI#2 New Sol: Edge relocation considering user plane latency", SA WG2 Meeting #139E (e-meeting), Jun. 1-12, 2020, S2-2004421, 6 pages.
Samsung, "Clarifications on User Plane Latency Requirement", Change Request, 3GPP TSG-WG SA2 Meeting #145E, May 17-28, 2021, S2-2105081, 5 pages.
Samsung, "Abstract procedure of AF requested User Plane Latency Requirement", SA WG2 Temporary Document, SA WG2 Meeting #146E, Aug. 16-27, 2021, S2-2105615r01, 2 pages.
"3rd Generation Partnership Project; Technical Specification Group Services and System Aspects; Procedures for the 5G System (5GS); Stage 2 (Release 16)", 3GPP TS 23.502 V16.2.0 (Sep. 2019), 525 pages.
Supplementary European Search Report dated Aug. 18, 2022 in connection with European Patent Application No. 20 86 5702, 13 pages.
Office Action dated Nov. 26, 2023, in connection with Korean Patent Application No. KR10-2019-0114341, 12 pages.
Communication pursuant to Article 94(3) EPC dated Jun. 26, 2024, in connection with European Patent Application No. 20865702.3, 7 pages.
Notice of Patent Grant issued Jul. 5, 2024, in connection with Korean Patent Application No. 10-2019-0114341, 4 pages.

* cited by examiner

APPARATUS AND METHOD FOR PSA-UPF RELOCATION IN WIRELESS COMMUNICATION SYSTEM

CROSS-REFERENCE TO RELATED APPLICATIONS

This application is a 371 National Stage of International Application No. PCT/KR2020/012577, filed Sep. 17, 2020, which claims priority to Korean Patent Application No. 10-2019-0114341, filed Sep. 17, 2019, the disclosures of which are herein incorporated by reference in their entirety.

BACKGROUND

1. Field

The disclosure generally relates to a wireless communication system, and more particularly, to an apparatus and a method for protocol data unit (PDU) session anchor-user plane function (PSA-UPF) relocation in a wireless communication system.

2. Description of Related Art

Efforts to develop enhanced 5th generation (5G) communication systems or pre-5G communication systems have been ongoing in order to meet the increasing demand for wireless data traffic since 4th generation (4G) communication systems were commercialized. For this reason, the 5G communication systems or pre-5G communication systems are called Beyond 4G network communication systems or post long term evolution (LTE) systems.

The 5G communication system is considered to be implemented in a superhigh frequency (mmWave) band (for example, 60 GHz band) to achieve a high data transmission rate. For the 5G communication systems, technologies for beamforming, massive multiple input multiple output (MIMO), full dimensional MIMO (FD-MIMO), array antenna, analog beam-forming, and large scale antenna are being discussed to mitigate a path loss of a radio wave and to increase a transmission distance of a radio wave in the superhigh frequency band.

In addition, technologies for evolved small cells, advanced small cells, cloud ratio access network (RAN), ultra-dense network, device to device communication (D2D), wireless backhaul, moving network, cooperative communication, coordinated multi-points (CoMP), and interference cancellation in the 5G communication systems are developing to enhance networks of systems.

In addition, hybrid frequency shift keying and quadrature amplitude modulation (FQAM) and sliding window superposition coding (SWSC), which are advanced coding modulation (ACM) schemes, and filter bank multi carrier (FBMC), non-orthogonal multiple access (NOMA), and sparse code multiple access (SCMA) which are enhanced accessing technology in the 5G systems are developing.

SUMMARY

Based on the above-described discussion, the disclosure relates to an apparatus and a method for protocol data unit (PDU) session anchor-user plane function (PSA-UPF) relocation in a wireless communication system.

According to various embodiments of the disclosure, there is provided an operating method of an application function (AF) node in a wireless communication system. The method includes: generating an AF request including information related to one or more data path latencies; and transmitting the information related to the one or more data path latencies to a session management function (SMF) node through a network exposure function (NEF) node.

According to various embodiments of the disclosure, there is provided an AF node in a wireless communication system. The network includes: at least one transceiver; and at least one processor, and the at least one processor is configured to: generate an AF request including information related to one or more data path latencies; and transmit the information related to the one or more data path latencies to a SMF node through a NEF node.

The apparatus and the method according to various embodiments of the present disclosure provide an apparatus and a method for protocol data unit (PDU) session anchor-user plane function (PSA-UPF) relocation in a wireless communication system.

The effect achieved in the disclosure is not limited to those mentioned above, and other effects that are not mentioned above may be clearly understood to those skilled in the art based on the description provided below.

DETAILED DESCRIPTION

Terms used in the disclosure are used to describe specified embodiments and are not intended to limit the scope of other embodiments. The terms of a singular form may include plural forms unless otherwise specified. All of the terms used herein, which include technical or scientific terms, may have the same meaning that is generally understood by a person skilled in the art. It will be further understood that terms, which are defined in a dictionary, may be interpreted as having the same or similar meanings as or to contextual meanings of the relevant related art and not in an idealized or overly formal way, unless expressly so defined herein in the disclosure. In some cases, even if the terms are terms which are defined in the specification, they should not be interpreted as excluding embodiments of the present disclosure.

In various embodiments of the disclosure described below, hardware-wise approach methods will be described by way of an example. However, various embodiments of the disclosure include technology using both hardware and software, and thus do not exclude software-based approach methods.

The disclosure described hereinbelow relates to an apparatus and a method for processing traffic of a service in a wireless communication system.

As used herein, terms indicating signals, terms indicating channels, terms indicating control information, terms indicating network entities, terms indicating components of a device are merely examples for convenience of explanation. Accordingly, the disclosure is not limited to the terms described below, and other terms having the same technical meanings may be used.

As used herein, terms for identifying an access node, terms indicating network entities or network functions (NFs), terms indicating messages, terms indicating an interface between network entities, terms indicating a variety of identification information are merely examples for convenience of explanation. Accordingly, the disclosure is not limited to the terms described below, and other terms having the same technical meanings may be used.

In addition, the disclosure describes various embodiments by using terms used in some communication standards (for example, 3rd generation partnership project (3GPP)), but these embodiments are merely examples. Various embodiments of the disclosure may be easily modified and applied to other communication systems.

Figure 1:
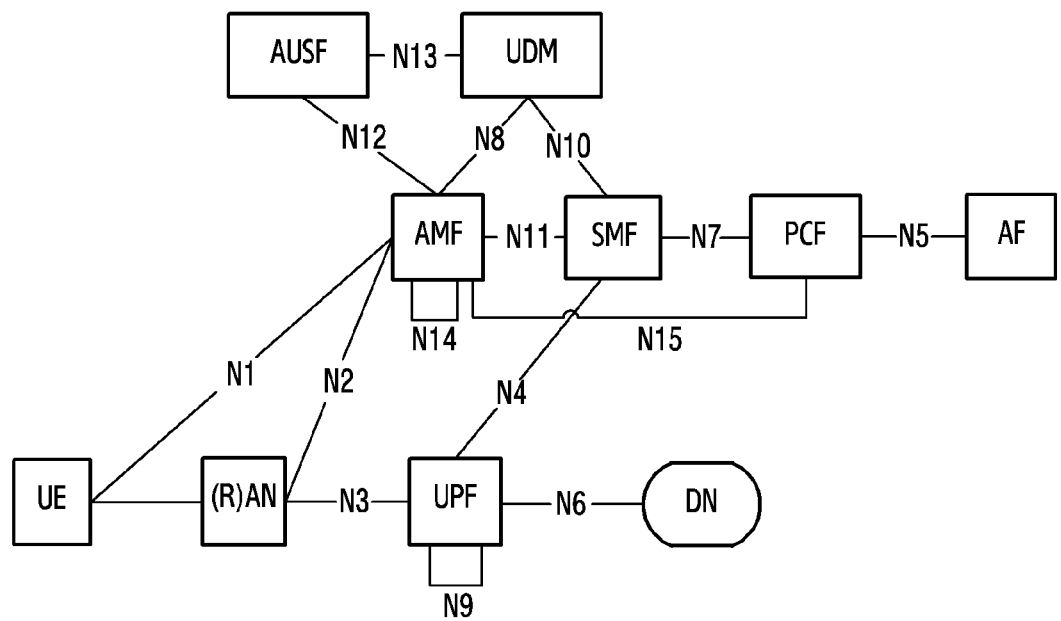
FIG. 1 is a view illustrating an example of a 5G system architecture which uses reference point expressions in a wireless communication system.

FIG. 1 illustrates an example of a 5G system architecture which uses reference point expressions in a wireless communication system.

Referring to FIG. 1, the 5G system architecture may include various components (that is, network functions (NFs)), and FIG. 1 illustrates some of them, for example, an authentication server function (AUSF), a (core) access and mobility management function (AMF), a session management function (SMF), a policy control function (PCF), an application function (AF), unified data management (UDM), a data network (DN), a user plane function (UPF), a (radio) access network ((R)AN), a terminal, that is, user equipment (UE).

The respective NFs support functions as follows.

The AUSF stores data for authentication of UE.

The AMF provides a function for access and mobility management of a UE basis, and basically, one UE may be connected to one AMF.

Specifically, the AMF supports functions such as signaling between CN nodes for mobility between 3GPP access networks, termination of a radio access network (RAN) CP interface (that is, an N2 interface), termination of NAS signaling (N1), NAS signaling security (NAS ciphering and integrity protection), AS security control, registration management (registration area management), connectivity management, idle mode UE reachability (including control and performance of paging retransmission), mobility management control (subscription and policy), intra-system mobility and inter-system mobility support, support of network slicing, SMF selection, lawful intercept (regarding an AMF event and an interface to an LI system), provision of transmission of a session management (SM) message between the UE and the SMF, a transparent proxy for SM message routing, access authentication, access authorization including roaming authority check, provision of transmission of an SMS message between the UE and the SMSF, a security anchor function (SAF), and/or security context management (SCM).

Some or all functions of the AMF may be supported within a single instance of one AMF.

The DN refers to, for example, an operator service, Internet access or third (3rd) party service. The DN transmits a downlink protocol data unit (PDU) to the UPF, or receives a PDU transmitted from the UE from the UPF.

The PCF receives information regarding a packet flow from an application server, and provides a function of determining a policy such as mobility management, session management, etc. Specifically, the PCF supports functions, such as support of a unified policy framework for controlling a network operation, provision of policy rules in order for CP function(s) (for example, the AMF, the SMF, etc.) to enforce policy rules, implementation of a front end for accessing relevant subscription information to determine a policy within a user data repository (UDR).

The SMF provides a session management function. If UE has a plurality of sessions, the respective sessions may be managed by different SMFs.

Specifically, the SMF supports functions, such as session management (for example, session establishment, correction, and canceling including tunnel maintenance between UPF and AN nodes), UE IP address allocation and management (selectively including authentication), selection and control of a UP function, traffic steering configuration for routing traffic to an appropriate destination in the UPF, termination of an interface toward policy control functions, enforcement of a control part of a policy and quality of service (QoS), lawful intercept (regarding an SM event and an interface to an LI system), termination of an SM part of a NAS message, a downlink data notification, an initiator of AN specific SM information (transmission to the AN through N2 via the AMF), SSC mode determination of a session, a roaming function, etc.

Some or all functions of the SMF may be supported within a single instance of one SMF.

The UDM stores subscription data of a user, policy data, etc. The UDM includes two parts, that is, an application front end (FE) and a user data repository (UDR).

The FE includes a UDM FE which is in charge of processing location management, subscription management, credential, and a PCF which is in charge of policy control. The UDR stores data required for functions provided by the UDF-FE, and a policy profile required by the PCF. The data stored in the UDR includes user subscription data including a subscription identifier, security credential, access and mobility-related subscription data and session-related subscription data, and policy data. The UDM-FE accesses subscription information stored in the UDR, and supports functions such as authentication credential processing, user identification handling, access authentication, registration/mobility management, subscription management, SMS management, etc.

The UPF transmits a downlink PDU received from the DN to the UE via the (R) AN, and transmits an uplink PDU received from the UE via the (R) AN to the DN.

Specifically, the UPF supports functions, such as an anchor point for intra/inter RAT mobility, an external PDU session point of interconnecting to a data network, packet routing and forwarding, a user plane part of packet inspection and policy rule enforcement, lawful intercept, traffic use reporting, an uplink classifier for supporting routing of a traffic flow to a data network, a branching point for supporting a multi-homed PDU session, QoS handling for a user plane (for example, packet filtering, gating, uplink/downlink rate enforcement), uplink traffic verification (SDF mapping between a service data flow (SDF) and a QoS flow), transport level packet marking within an uplink and a downlink, downlink packet buffering and downlink data notification triggering function, etc. Some or all functions of the UPF may be supported within a single instance of one UPF.

The AF interacts with a 3 GPP core network to provide a service (for example, to support a function such as application influence on traffic routing, network capability exposure approach, interaction with a policy framework for policy control).

The (R)AN refers to a new radio access network supporting both evolved E-UTRA (E-UTRA) which is an evolved version of 4G radio access technology, and new radio (NR) access technology (for example, gNB).

The gNB supports functions, such as functions for radio resource management (that is, radio bearer control, radio admission control), connection mobility control, dynamic allocation of resources to UE in an uplink/downlink (that is, scheduling), internet protocol (IP) header compression, encryption of a user data stream and integrity protection, selection of an AMF at the time of attachment of UE when routing to the AMF is not determined from information provided to the UE, user plane data routing to UPF(s), control plane information routing to the AMF, connection setup and canceling, scheduling and transmission of a paging message (occurring from the AMF), scheduling and transmission of system broadcast information (occurring from the AMF or operating and maintenance (O & M)), measurement for mobility and scheduling and measurement report configuration, transport level packet marking in an uplink, session management, support of network slicing, QoS flow management and mapping to a data radio bearer, support of UE in an inactive mode, a distribution function of an NAS message, an NAS node selection function, radio access network sharing, dual connectivity, tight interworking between the NR and the E-UTRA.

The UE refers to a user device. The user device may be referred to as a terminal, mobile equipment (ME), a mobile station (MS). In addition, the user device may be a portable device such as a notebook computer, a mobile phone, a personal digital assistant (PDA), a smartphone, a multimedia device, or the like, or may be a non-portable device such as a personal computer (PC), a vehicle-mounted device.

Figure 5:
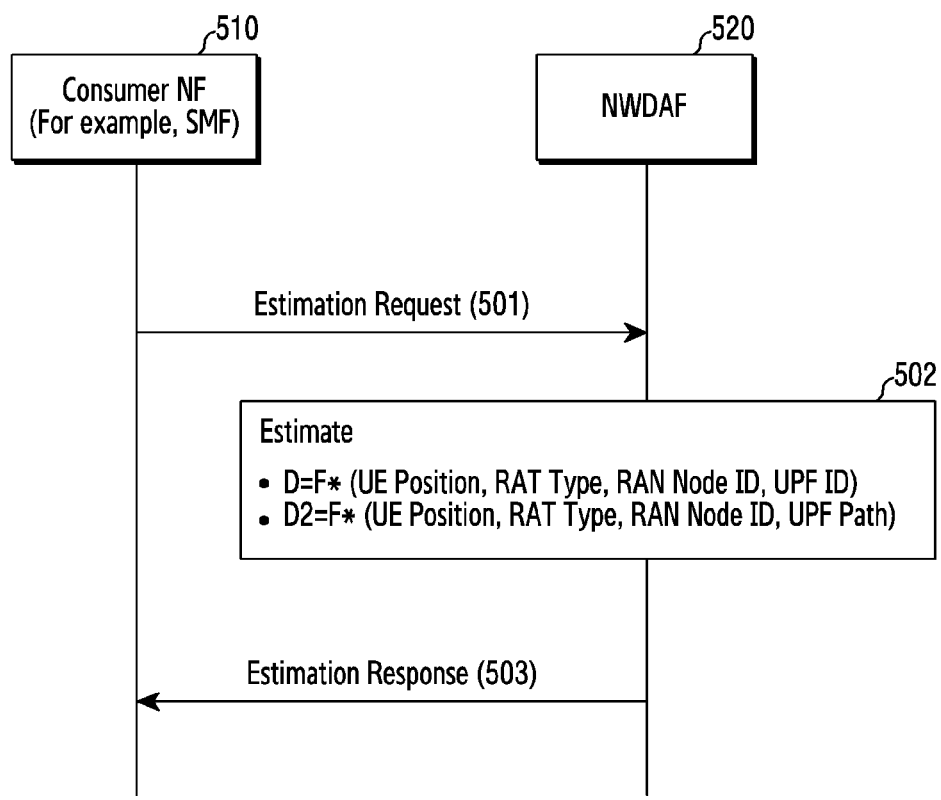
FIG. 5 is a view illustrating a procedure for providing network latency estimation information in a wireless communication system according to various embodiments of the disclosure.

FIG. 1 does not illustrate an unstructured data storage network function (UDSF), a structured data storage network function (SDSF), a network exposure function (NEF), and an NF repository function (NRF) for clarity of explanation, but all NFs illustrated in FIG. 5 may interwork with the UDSF, NEF, and NRF when necessary.

The NEF provides a means for safely exposing functions provided by 3GPP network functions, for example, 3rd party, internal exposure/re-exposure, an application function, services and capabilities for edge computing. The NEF receives information (based on exposed capability (capabilities) of other network function(s)) from other network function(s). The NEF may store the received information as structured data by using an interface standardized to a data storage network function. The stored information may be re-exposed to other network function(s) and application function(s) by the NEF, and may be used for other purposes such as analysis, etc.

The NRF supports a service discovery function. The NRF receives an NF discovery request from an NF instance, and provides discovered information of the NF instance to the NF instance. In addition, available NF instances and services supported by the NF instances are maintained.

The SDSF is an optional function for supporting a function of storing and retrieving information as structured data by a certain NEF.

The UDSF is an optional function for supporting a function of storing and retrieving information as unstructured data by a certain NF.

FIG. 1 illustrates a reference model when UE access one DN by using one PDU session for convenience of explanation, but the disclosure is not limited thereto.

The UE may simultaneously access two (that is, local and central) data networks by using a plurality of PDU sessions. In this case, two SMFs may be selected for different PDU sessions. However, each SMF may have a capability to control both the local UPF and the central UPF within the PDU session.

In addition, the UE may simultaneously access two (that is, local and central) data networks provided in a single PDU session.

In a 3GPP system, a conceptual link connecting between NFs in a 5G system is defined as a reference point. Reference points included in the 5G system architecture expressed in FIG. 1 are exemplified as follows:

N1: Reference point between the UE and the AMF;
N2: Reference point between the (R) AN and the AMF;
N3: Reference point between the (R) AN and the UPF;
N4: Reference point between the SMF and the UPF;
N5: Reference point between the PCF and the AF;
N6: Reference point between the UPF and the data network;
N7: Reference point between the SMF and the PCF;
N8: Reference point between the UDM and the AMF;
N9: Reference point between two core UPFs;
N10: Reference point between the UDM and the SMF;
N11: Reference point between the AMF and the SMF;
N12: Reference point between the AMF and the AUSF;
N13: Reference point between the UDM and the authentication server function (AUSF);
N14: Reference point between two AMFs; and
N15: Reference point between the PCF and the AMF in the case of a non-roaming scenario, reference point between a PCF and an AMF in a visited network in the case of a roaming scenario.

Figure 2:
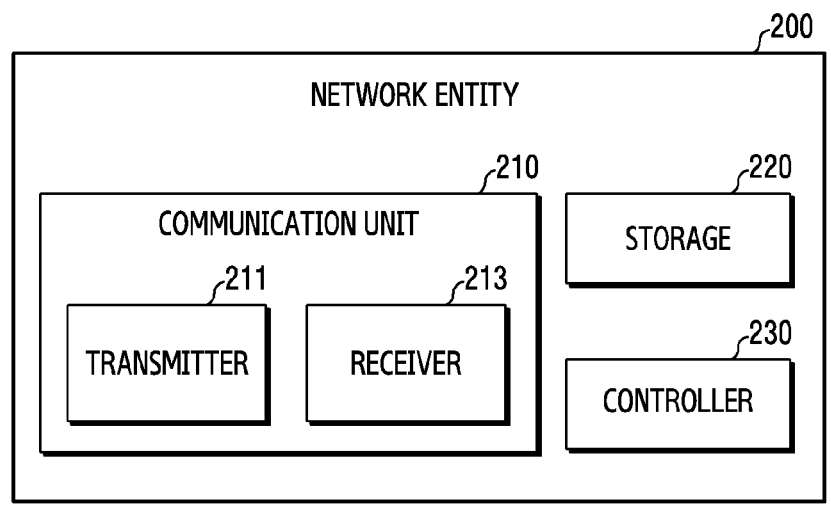
FIG. 2 is a view illustrating a configuration of a network entity in a wireless communication system according to various embodiments of the disclosure.

FIG. 2 illustrates a configuration of a network entity in a wireless communication system according to various embodiments of the disclosure.

The network entity of the disclosure is a concept including a network function according to system implementation. The term "unit" or terms ending with suffixes "-er," and "-or" used in the following description refer to a unit processing at least one function or operation, and may be implemented by hardware, software, or a combination of hardware and software.

The network entity according to various embodiments of the disclosure may include a communication unit 210, a storage 220, and a controller 230 to control overall operations of the network entity 200.

The communication unit 210 transmits and receives signals to and from other network entities. Accordingly, an entirety or a part of the communication unit 210 may be referred to as a 'transmitter 211,' a 'receiver 213,' or a 'transceiver 210.'

The storage 220 may store data such as a basic program for the operation of the network entity 200, an application, configuration information, or the like. The storage 220 may be configured by a volatile memory, a nonvolatile memory, or a combination of a volatile memory and a nonvolatile memory. In addition, the storage 220 provides stored data according to a request of the controller 230.

The controller 230 controls overall operations of the network entity 200. For example, the controller 230 may transmit and receive signals via the communication unit 210. In addition, the controller 230 may write and read out data on or from the storage 220. In addition, the controller 230 may perform functions of a protocol stack required by communication standards. To achieve this, the controller 230 may include a circuit, an application-specific circuit, at least one processor or a micro processor, or may be a part of a processor. In addition, a part of the communication unit 210 and the controller 330 may be referred to as a communication processor (CP). The controller 230 may control the network entity 200 to perform a certain operation according to various embodiments of the disclosure.

The communication unit 210 and the controller 230 may not necessarily be implemented by separate modules, and may be implemented by one configuration unit in the form of a single chip or a software block. The communication unit 210, the storage 220, and the controller 230 may be electrically connected with one another. In addition, operations of the network entity 200 may be implemented by providing the storage 220 which stores a corresponding program code in the network entity 200.

The network entity 200 includes a network node, and may be one of a base station (RAN), an AMF, an SMF, a UPF, an NF, an NEF, an NRF, a CF, an NSSF, a UDM, an AF, an AUSF, a SCP, a UDSF, an NWDAF, a context storage, an operations, administration and maintenance (OAM), an EMS, a configuration server, an identifier (ID) management server.

Various embodiments of the disclosure provide a method for managing a session according to a movement of a terminal in a cellular wireless communication system, for example, a 5G system. Various embodiments of the disclosure relate to a method for relocation of an application server that a terminal accesses according to a movement of the terminal in edge computing.

3GPP which is in charge of cellular mobile communication standardizing calls a new core network structure a 5G core (5GC) in order to achieve evolution from an existing 4G LTE system to a 5G system, and proceeds with standardizing.

The 5GC supports the following distinct functions, compared to an evolved packet core (EPC) which is a network core for existing 4G.

First, in the 5GC, a network slice function is introduced. The 5GC should support various types of terminals and services as requirements of 5G. For example, the terminal types and services may include enhanced mobile broadband (eMBB), ultra reliable low latency communications (URLLC), massive machine type communications (mMTC). The terminals/services have different requirements for the core network. For example, the eMBB service requires a high data rate, and the URLLC service requires high stability and low latency. The network slice scheme is suggested to satisfy the above-described requirements of various services.

The network slice is a method for making a plurality of logical networks by virtualizing one physical network, and respective network slice instances (NSIs) may have different characteristics. Accordingly, each NSI has a network function (NF) suitable for their own characteristics, and may satisfy various service requirements. Various 5G services may be efficiently supported by allocating an NSI suitable for characteristics of a service required by each terminal.

Second, the 5GC may smoothly support a network virtualization paradigm by separating a mobility management function and a session management function. In existing 4G LTE, all terminals may receive services in a network by exchanging signaling with a single core device, which is a mobility management entity (MME) which is in charge of registration, authentication, mobility management and session management functions. However, in 5G, the number of terminals explosively increases and mobility and traffic/session characteristics to be supported are subdivided according to a type of a terminal. To this end, if all functions are supported by a single device such as an MME, scalability of adding an entity according to a necessary function may be degraded. Accordingly, various functions are developing based on a structure that separates a mobility management function and a session management function in order to enhance scalability in light of function/implementation complexity of a core device which is in charge of a control plane, and a signaling load.

In a related-art 3GPP 5G core network, relocation of a PDU session anchor-user plane function (PDU-UPF) does not consider a data path latency. That is, in the related-art 3GPP 5G core network, relocation of the PSA-UPF is determined by utilizing topology information in a session management function (SMF). Various embodiments of the disclosure provide a method for a 5G core network and an application to determine whether to relocate a PSA-UPF by considering a latency time of a data path, based on a request of an application function which requires a low latency service.

According to various embodiments of the disclosure, a 5G core network and an application determine a movement of a PSA-UPF by considering a latency of a data path. When a handover in which a terminal receiving a service one or more applications leaves a service area in which a currently connected application is disposed occurs, and the PSA-UPF moves, an IP address of the terminal may be changed and a service may be interrupted.

According to various embodiments of the disclosure, when a latency requested by the application is satisfied through an existing data path in a region to which the terminal is moved, by considering the latency requested by the application program, service interruption may be minimized by not performing PSA-UPF relocation.

According to various embodiments of the disclosure, when a terminal moves and provides a service through a newly changed path, or when a latency requested by an application is not satisfied, a path to a new PSA-UPF may be reconfigured and a service that satisfies the latency time requested by the application may be provided.

Figure 3:
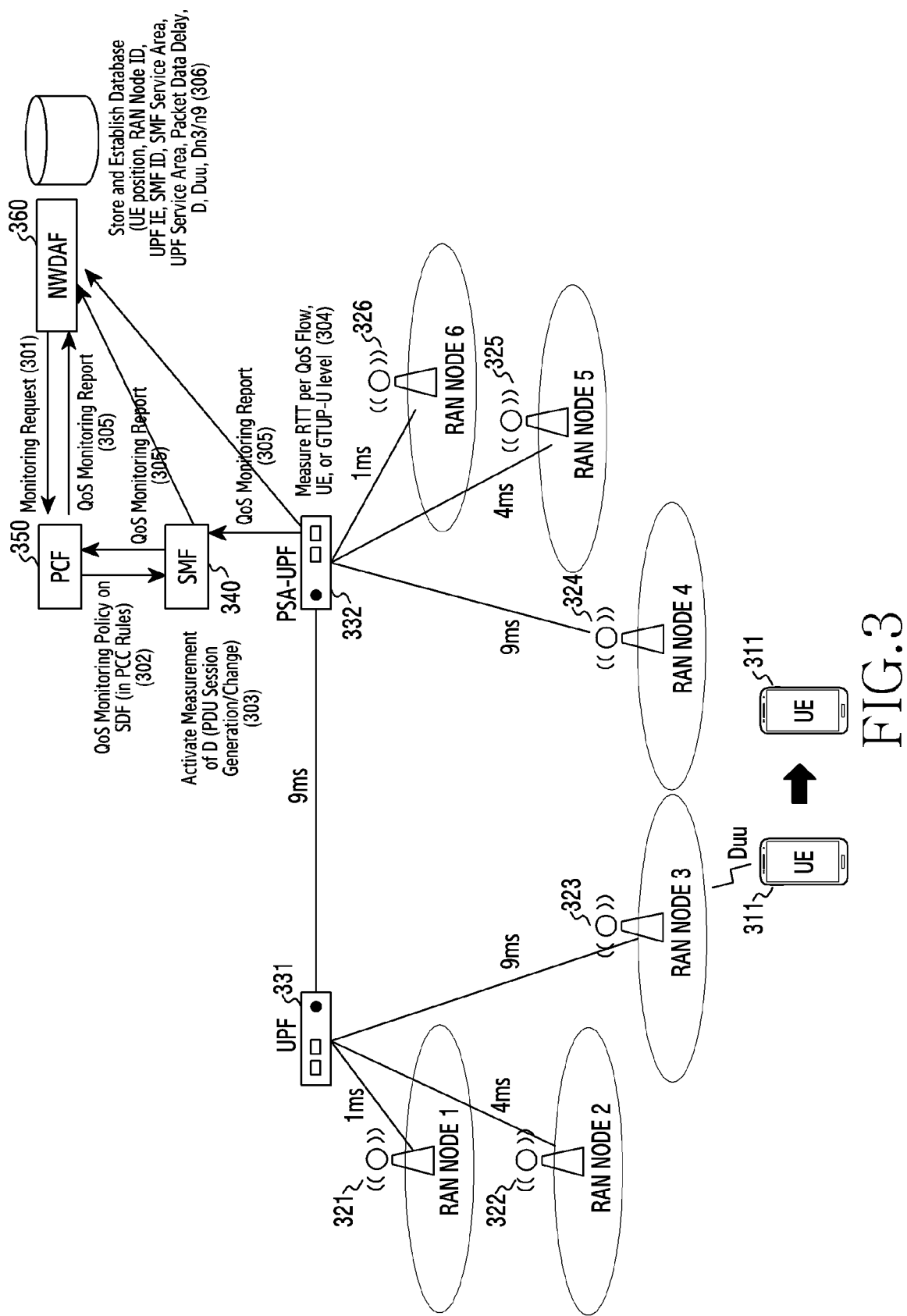
FIG. 3 is a view illustrating a configuration of a network in light of data path latencies in a wireless communication system according to various embodiments of the disclosure.

FIG. 3 illustrates a network configuration in light of data path latencies in a wireless communication system according to various embodiments of the disclosure.

Referring to FIG. 3, a terminal 311 is connected with RAN nodes 321, 322, 323, 324, 325, 326 through a Uu interface, and a latency time between the terminal 311 and the RAN node 321, 322, 323, 324, 325, 326 is expressed as Duu.

The RAN node 321, 322, 323, 324, 325, 326 and an UPF 331, 332 are connected with each other via an N3 interface, and a latency time of the N3 section is expressed as Dn3. A latency time between the RAN node 321, 322, 323, 324, 325, 326 and the UPF 331, 332 may be a network latency time that occurs in a process in which a packet passes through a network switch and a router, etc. installed between the physical RAN node 321, 322, 323, 324, 325, 326 and the UPF 331, 332. Such a latency time Dn3 may be proportional to a physical distance. Referring to FIG. 3, the RAN node 1 321 which is positioned at a short distance from a data center where the UPF 331 is positioned may have a latency time of 1 ms, the RAN node 2 322 which is positioned at an intermediate distance may have a latency time of 4 ms, and the RAN node 3 323 which is positioned at a long distance may have a latency time of 9 ms.

The UPF 331 and the UPF 332 are connected with each other via an N9 interface, and a latency time of the N9 section is expressed as Dn9. Similarly to the latency time between the RAN node 321, 322, 323, 324, 325, 326 and the UPF 331, 332, a latency time between the UPFs 331, 332 may be a network latency time that occurs in a process in which a packet passes through a network switch and a router, etc. installed between the UPFs 331, 332, and such a latency time Dn9 may be proportional to a physical distance. Referring to FIG. 3, the two UPFs 331, 332 may have a latency time of 9 m therebetween.

A data path latency D in a 5G core network may be calculated as shown in Equation 1 presented below:

$$D=Duu+Dn3+Dn9 \quad \text{Equation 1}$$

In Equation 1, D is a latency time between the terminal 311 and the PSA-UPF 332. Duu is a UL/DL packet latency time between the terminal 311 and the RAN node 323. Dn3 is a UL/DL packet latency time between the RAN node 323 and the UPF 331. Dn9 is a packet latency time between the intermediate UPF (I-UPF) 331 and the PSA-UPF 332 when there is the I-UPF.

An SMF 340 is connected with the PSA-UPF 332 via a UPF N3 interface to perform functions of QoS monitoring and a monitoring report.

A PCF 350 provides the QoS monitoring function for measuring a latency time, and receives a QoS monitoring request from a network function (NF) which requests the QoS monitoring function like an NWDAF 360, and provides the function of the requested QoS monitoring report.

The NWDAF 360 configures a database regarding a terminal position, an RAN node identifier (ID), a UPF identifier, a PSA-UPF identifier, an SMF service area, a packet latency time regarding a UPF service area, and a latency time of each interface of Uu, Dn3, Dn9, by utilizing the QoS monitoring function.

Referring to FIG. 3, at step 301, the NWDAF 360 transmits a monitoring request to the PCF 350.

At step 302, the PCF 350 transmits a QoS monitoring policy regarding a service data flow (SDF) among policy and charging control (PCC) rules.

At step 303, the SMF 340 activates measurement of D of Equation 1. Specifically, the SMF 340 generates/changes a PDU session.

At step 304, the PSA-UPF 332 measures a round trip time (RTT) per QoS flow, per UE, or general packet radio service (GPRS) tunnel protocol-user plane (GTP-U) level.

At step 305, the PSA-UPF 332 transmits a QoS monitoring report to the SMF 340 and/or the NWDAF 360. In addition, the SMF 340 transmits the QoS monitoring report to the PCF 350 and/or the NWDAF 360. In addition, the PCF 350 transmits the QoS monitoring report to the NWDAF 360.

At step 306, the NWDAF 360 performs database storage and establishment. According to an embodiment, the database may store at least one of the terminal position, the RAN node ID, the UPF ID, the SMF ID, the SMF service area, the UPF service area, the packet data latency, D, Duu, Dn3/n9.

First Embodiment

In the first embodiment, a data path latency database establishment procedure will be described with reference to FIG. 4. The data path latency database establishment procedure follows a procedure shown in FIG. 4.

Figure 4:
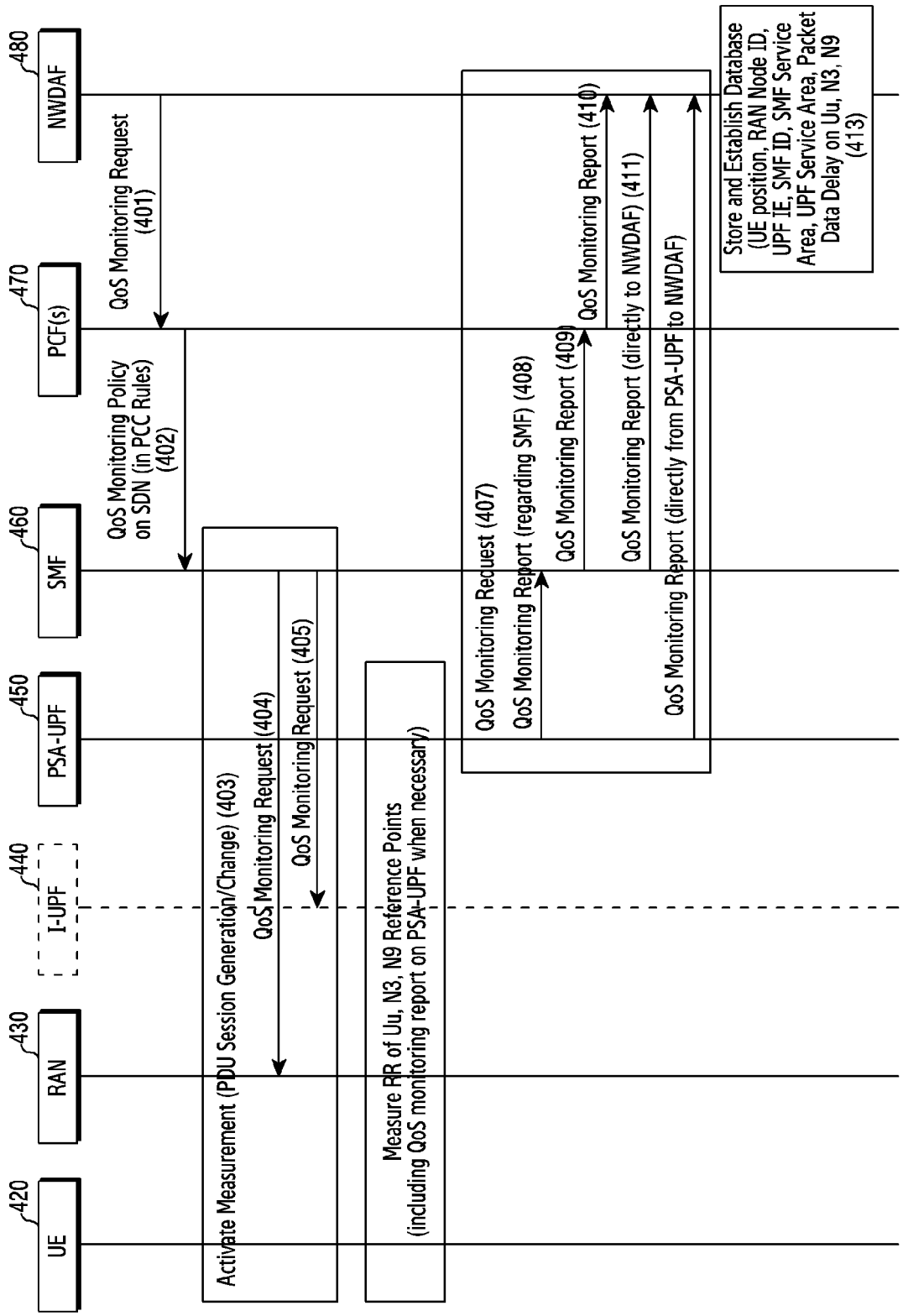
FIG. 4 is a view illustrating a data path latency database establishment procedure in a wireless communication system according to various embodiments of the disclosure.

FIG. 4 illustrates a data path latency database establishment procedure in a wireless communication system according to various embodiments of the disclosure.

At step 400 before step 401 of FIG. 4, which is not illustrated in FIG. 4, an NWDAF 480 selects a plurality of sample terminals (UE) 420 to collect data regarding a packet network latency.

At step 410, the NWDAF 480 transmits a QoS monitoring request regarding the sample UE 420 selected at step 400 to a PCF 470. The QoS monitoring request that the NWDAF 480 transmits to the PCF 470 may include the following information:

(1) Terminal identification information: This information may include at least one of a subscription permanent identifier (SUPI) for identifying a terminal, a generic public subscription identifier (GPSI), a mobile subscriber integrated service digital network (ISDN) (MS-ISDN) number. Alternatively, this information may include a group identifier for displaying a plurality of pieces of terminal identification information;

(2) Local information for indicating terminals existing in a specific region: This information may include area of interest (AOI) information when all or some of terminals in a specific region are targeted. The AOI information may include information of at least one of a tracking area collection, a UPF service region, an SMF service region, a cell list, a RAN node identifier list; and (3) QoS monitoring information for each terminal which requests a QoS report: This information indicates QoS measurement information to be measured, and includes the following information:

(3-1) Latency time measurement information in each section;

(3-1-1) Data latency time information between a terminal and a PSA-UPF;

(3-1-2) Measurement information in each section (identification information of each time and each section of the Uu interface, N3 or N9); and (3-1-3) Unidirectional or bidirectional measurement information.

At step 402, the PCF 470 which receives the QoS monitoring request from the NWDAF 480 may identify whether the request information conforms to a policy of an operator, and may approve the QoS monitoring request. When the PCF 470 approves the QoS monitoring, the PCF 470 transmits a QoS monitoring policy to an SMF 460. The QoS monitoring policy includes the following contents.

At step 403, the SMF 460 initiates a QoS measurement procedure or a network latency measurement procedure.

Specifically, at step 403, the QoS measurement may be activated and a PDU session may be generated/changed. At step 404, the SMF 460 may transmit the QoS monitoring request to a RAN 430. At step 405, the SMF 460 may transmit the QoS monitoring request to an I-UPF 440. A detailed QoS measurement procedure will be described in a fifth embodiment with reference to FIG. 9.

At step 406, a PSA-UPF 450, the I-UPF 440, and the RAN 430 measure an RTT regarding Uu, N3, N9 interface. Measurement of the RTT may include a QoS monitoring report regarding the PSA-UPF 450. The detailed QoS measurement procedure will be described below in the fifth embodiment with reference to FIG. 9.

At step 407, the PSA-UPF 450 transmits a QoS monitoring report based on the measured RTT to the SMF 460. At step 408, the PSA-UPF 450 may transmit a QoS monitoring report regarding the SMF to the SMF 460. At step 409, the SMF 460 may transmit the QoS monitoring report to the PCF 470. At step 410, the PCF 470 may transmit the QoS monitoring report to the NWDAF 480. At step 411, the SMF 460 may directly transmit the QoS monitoring report to the NWDAF 480. At step 412, the PSA-UPF 450 may directly transmit the QoS monitoring report to the NWDAF 480.

The QoS monitoring report that the PCF 470 transmits to the NWDAF 480 may include the following information:
(1) Information of a latency time spent in a section of the terminal and the PSA-UPF (RTT information or unidirectional latency time information);
(2) Information of a latency time spent in the Uu interface section (RTT information or unidirectional latency time information);
(3) Latency information regarding the N3 section;
(3-1) Latency time information of the N3 section: Unidirectional latency time or RTT; and
(3-2) Identification information of the N3 section: UPF identifier and RAN node ID information, tunnel identifier (for example, a tunnel endpoint identifier (TEID) and UPF and PSA-UPF address) information; and
(4) Latency information regarding the N9 section;
(4-1) Latency time information of the N9 section: Unidirectional latency information or RTT latency time information; and
(4-2) Identification information of the N9 section (I-UPF identifier and a PSA-UPF identifier), tunnel identifier (for example, TEID and I-UPF, PSA-UPF address) information.

In the information included in the QoS monitoring report that the PCF 470 transmits to the NWDAF 480, information regarding the latency time may include statistical information indicating results of measuring the latency time multiple times, such as an average, a maximum value, a minimum value, or a median value, etc.

At step 413, the NWDAF 480 records the RTT value measured for the selected terminal(s). At step 413, the NWDAF 480 may store and establish a database. Information stored in the database may include a UE position, an RAN node ID, a UPF ID, an SMF ID, an SMF service area, a UPF service area, packet data latencies regarding Uu, N3, N9. For step 413, step 401 and step 407 may be repeatedly performed with respect to the plurality of selected terminals. The information stored in the database at step 413 may include at least one piece of information of the following information:
(1) Terminal position information;
(2) RAN node ID;
(3) UPF ID, SMF ID;
(4) UPF service area information, SMF service area information;
(5) Packet data latency information measured for each of Uu, N3, N9 interfaces.

Second Embodiment

In the second embodiment, a procedure of providing network latency estimation information will be described with reference to FIG. 5.

FIG. 5 illustrates a procedure of providing network latency estimation information in a wireless communication system according to various embodiments of the disclosure.

An NWDAF 520 may provide network latency information which is estimated according to a position of a terminal, a radio access technology (RAT) type, a RAN node ID, a UPF ID, from information collected by measuring QoS.

At step 501, an SMF or other consumer NFs 510 transmit a request for estimation information regarding a data path to the NWDAF 520. The request at step 501 may include at least one piece of information of a current UE position, a RAT type, a RAN node ID, a UPF ID, an SMF ID, a UPF service area.

At step 502, the NWDAF 520 estimates estimable latency information by considering a current position of the terminal, a current time, a time of a service area, a service area UPF ID, a UPF path, based on collected information. According to an embodiment, a latency time D may be estimated by considering the UE position, the RAT type, the RAN node ID, the UPF ID. According to an embodiment, a latency time D2 may be estimated by considering the UE position, the RAT type, the RAN node ID, the UPF path.

At step 503, the NWDAF 520 transmits the network latency information estimated at step 502 to the consumer NF (for example, the SMF) 510 which has requested estimation.

Third Embodiment

In the third embodiment, a PSA-UPF relocation procedure according to network latency requirements will be described with reference to FIG. 6.

Figure 6:
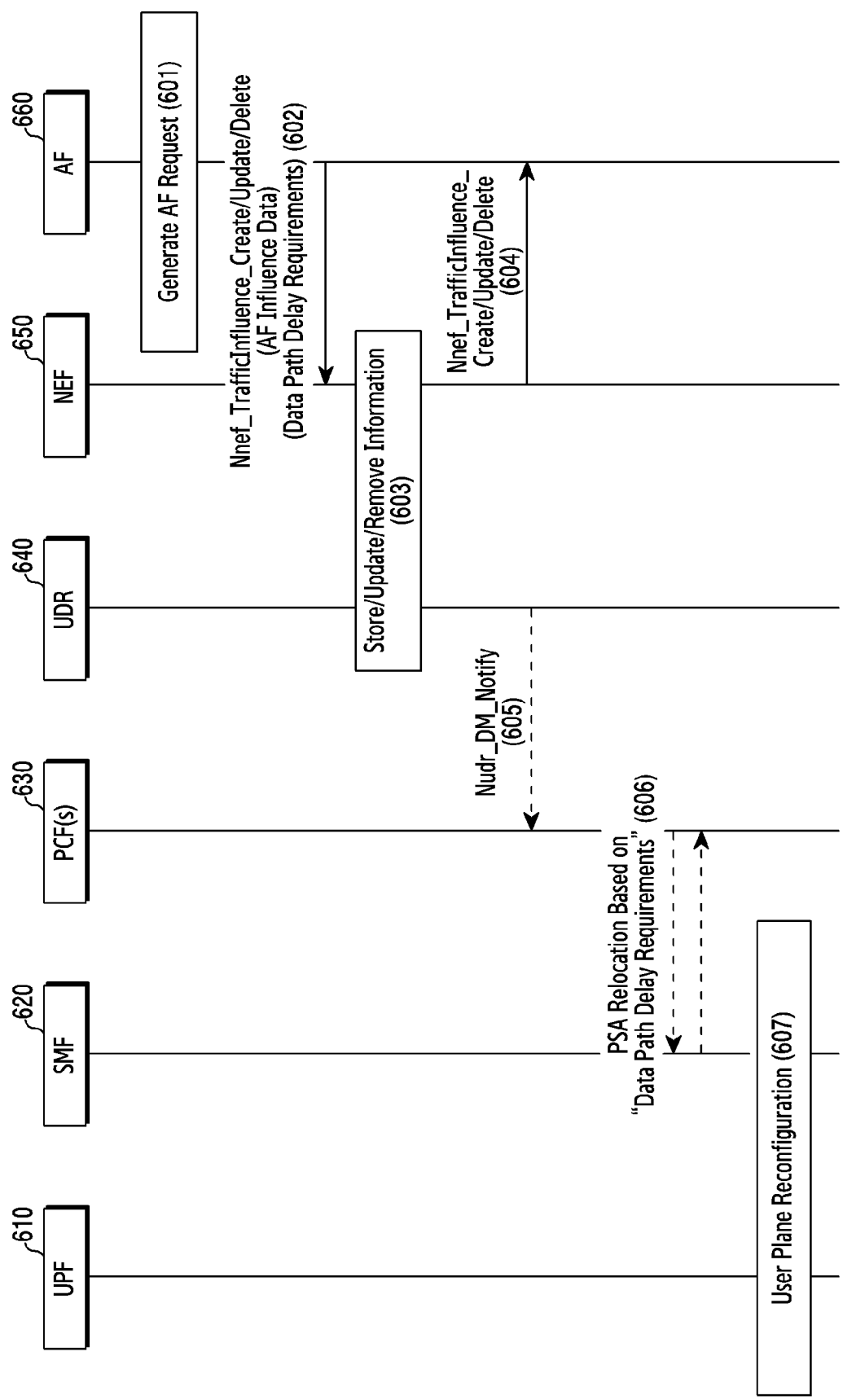
FIG. 6 is a view illustrating a PSA-PPF relocation determination procedure considering a data path latency in a wireless communication system according to various embodiments of the disclosure.

FIG. 6 illustrates a PSA-UPF relocation determination procedure considering a data path latency in a wireless communication system according to various embodiments of the disclosure.

At step 601, an AF 660 generates an AF request message. The AF 660 may generate the AF request message including latency requirements of a data path required by an application when generating the AF request message.

The latency requirements of the data path may include the following information.
(1) Maximum data path latency time: A value of a maximum data path latency time is a target latency time of a data path that is targeted by the AF 660. When an SMF 620 is capable of application relocation through an AF influence request, a latency time of a data path between a relocated PSA-UPF and a terminal should be smaller than or equal to the value of the maximum data path latency time provided in this information. The SMF 620 may acquire an estimation latency time between a PSA-UPF reselected according to movement of the terminal, and the terminal. The SMF 620 may use a value that is previously calculated with respect to the estimation latency time, or may acquire the estimation latency time by requesting from an NWDAF. The SMF 620 may determine whether the estimation latency time between the terminal and the PSA-UPF satisfies requirements regarding the requested data path latency time, and accordingly, may determine whether to relocate the PSA-UPF.

(2) Minimum latency time preference indicator of a data path: When the SMF 620 selects a UPF 610 or a PSA-UPF, the AF 660 may select the UPF 610 or the PSA-UPF that has a minimum latency time regarding a data path between the terminal and the UPF 610 or the PSA-UPF.

At step 602, the AF 660 transmits a Nnef_Traffic Influence_Create/Update/Delete message to an NEF 650. The message at step 602 may include at least one of AF influence data, data path latency requirements.

At step 603, the NEF 650 which receives the message of step 602 from the AF 660 may store/update/remove data path latency-related information in/from a UDR 640.

At step 604, the NEF 650 transmits a Nnef_Traffic Influence_Create/Update/Delete message to the AF 660.

At step 605, when there is change in the data path latency-related information, the UDR 640 transmits a Nudr_DM_Notify message to a PCF 630 which subscribes to a change notification service of corresponding information.

At step 606, the PCF 630 transmits a Npcf_SMpolicy-Control_UpdatedNotify message to the SMF 620. The message at step 606 may include information related to relocation of the PSA-PCF based on the data path latency requirements. Specifically, at step 606, the PCF 630 transmits, to the SMF 620, PCC rules including AF influenced traffic steering enforcement control information and traffic steering control information.

The AF influenced traffic steering enforcement control information may include at least one piece of information of the following information:
  (1) Data network access identifier (DNAI) list;
  (2) Traffic steering policy identifier;
  (3) N6 traffic routing information; and
  (4) AF subscription information regarding an UP change event,
    (4-1) Early notification or late notification;
    (4-2) Notification target address and notification correlation ID; and
    (4-3) AF acknowledgement.

The traffic steering control information may include at least one piece of information of the following information:
  (1) Terminal IP address maintenance indicator;
    (1-1) The SMF 620 determines whether to re-select a PSA by using the terminal IP address maintenance indicator,
  (2) Shortest data path latency preference indicator; and
    (2-1) The SMF 620 selects a PSA-UPF having a minimum data path latency time by using the shortest data path latency preference indicator,
  (3) Target latency requirements;
    (3-1) The SMF 620 determines whether to re-select a PSA by using the target latency requirement indicator.

At step 607, the SMF 620 which receives the PCC rules from the PCF 630 performs user plane reconfiguration of a PDU session. In order to perform the user plane reconfiguration, the SMF 620 performs the following operations:
  (1) adding, changing, deleting a UPF (for example, an uplink classifier UPF (ULCL UPF) or a branching point UPF);
  (2) allocating a new IPv6 to a terminal to which internet protocol version 6 (IPv6) multi-homing is applied;
  (3) changing to a UPF belonging to a target DNAI provided along with new traffic steering rules;
  (4) subscribing to an area of interest notification service in the AMF;
  (5) selecting a PSA-UPF satisfying a requested data path latency time;
  (6) considering, by the SMF 620, PSA-UPF reselection when a terminal performs a handover (HO) procedure, when the terminal leaves or enters an AOI, when the terminal transmits a registration request due to position movement; and
  (7) when the PSA-UPF reselection is determined, determining whether to re-select a PSA-UPF by considering the requested data path latency time and selecting a PSA-UPF having the minimum data path latency time among the plurality of PSA-UPFs, or selecting a PSA-UPF that satisfies a required latency time.

Fourth Embodiment

In the fourth embodiment, a method for relocating an application according to a latency time of a data path will be described with reference to FIGS. 7 and 8.

Figure 7:
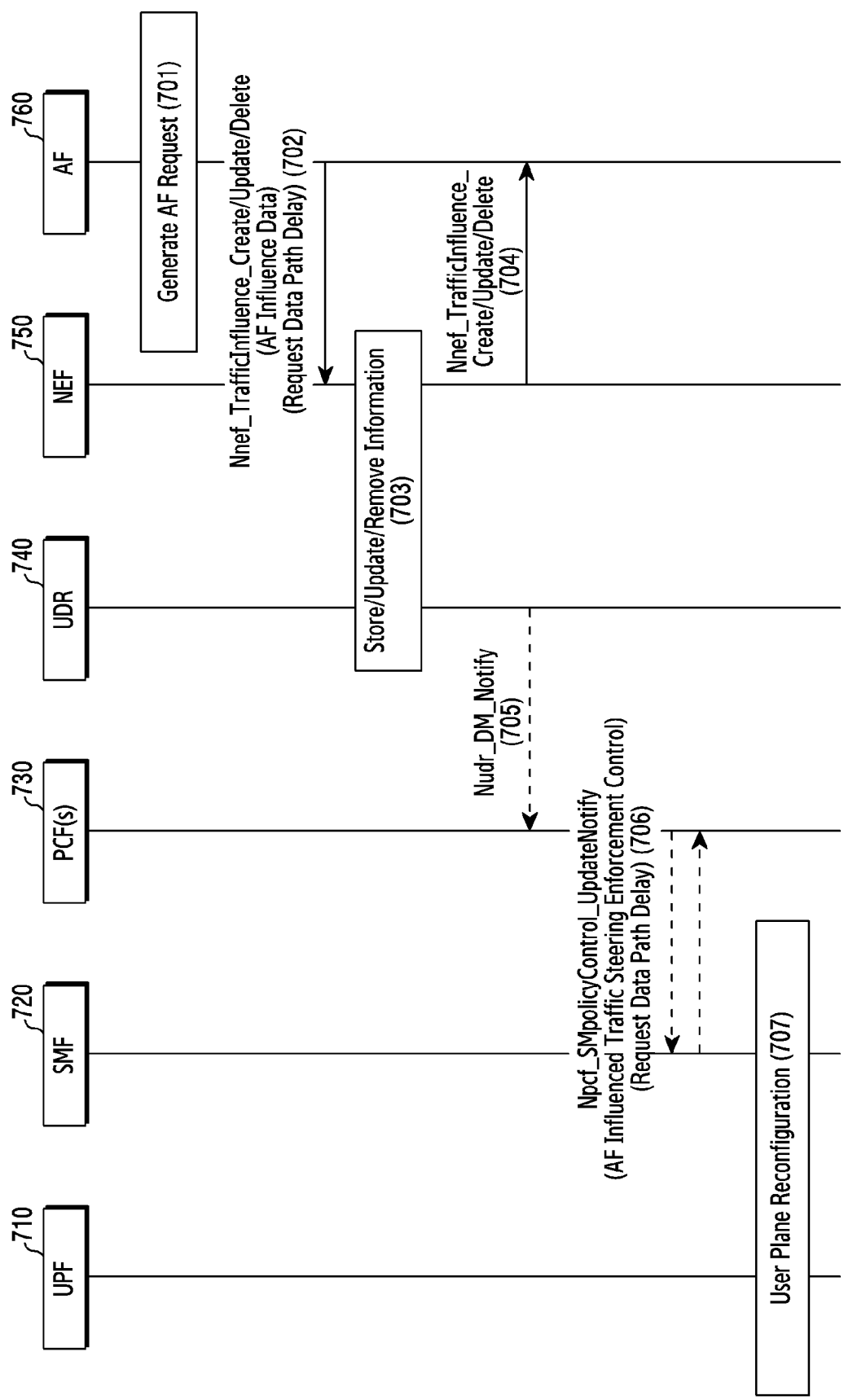
FIG. 7 is a view illustrating an AF traffic influence request procedure including a data path latency information request in a wireless communication system according to various embodiments of the disclosure.

FIG. 7 illustrates an AF traffic influence request procedure including a data path latency information request in a wireless communication system according to various embodiments of the disclosure.

At step 701, an AF 760 generates an AF request message. The AF 760 may generate the AF request message including latency requirements of a data path required by an application when generating the AF request message.

At step 702, the AF 760 transmits a Nnef_TrafficInfluence_Created/Updated Delete message to an NEF 750. The message at step 702 may include at least one of AF influence data, data path latency requirements. Specifically, at step 702, the AF 760 requests information for determining application relocation through the NEF 750 when a terminal goes into a state in which PSA-UPF relocation in a target DNAI is possible. The request of the AF 760 includes information for AF subscription to an event of an SMF 720 corresponding thereto. This information may be information for subscribing to a UPF path change event of a PDU session. In addition, the AF 760 requests information regarding a latency time of a data path estimated for each target DNAI.

At step 703, the NEF 750 which receives the request of the AF 760 stores/updates/removes data path latency-related information in/from a UDR 740.

At step 704, the NEF 750 transmits a Nnef_TrafficInfluence_Create/Update/Delete message to the AF 760.

At step 705, when there is a change in the data path latency-related information, the UDR 740 transmits a Nudr_DM_Notify message to a PCF 730 which subscribes to a change notification service of corresponding information.

At step 706, the PCF 730 transmits a Npcf_SMPolicy-Control_UpdateNotify message to the SMF 720. The message at step 706 may include information related to AF influenced traffic steering enforcement control, information related to data path latency requirements. Specifically, at step 706, the PCF 730 transmits, to the PCF 730, PCC rules including AF influenced traffic steering enforcement control information and traffic steering control information.

The AF influenced steering enforcement control information included in the PCC rules includes a DNAI list, a traffic steering policy identifier, N6 traffic routing information, AF subscription information on a UPF change event. The AF subscription information includes information on whether an early notification is requested, a notification target address, a notification correlation ID, AF acknowledgement.

According to an embodiment, the message at step 706 may further include at least one of a latency time information request indicator of a data path estimated for each target DNAI, an indicator which requests latency time information of a data path that the terminal currently experiences.

Figure 8:
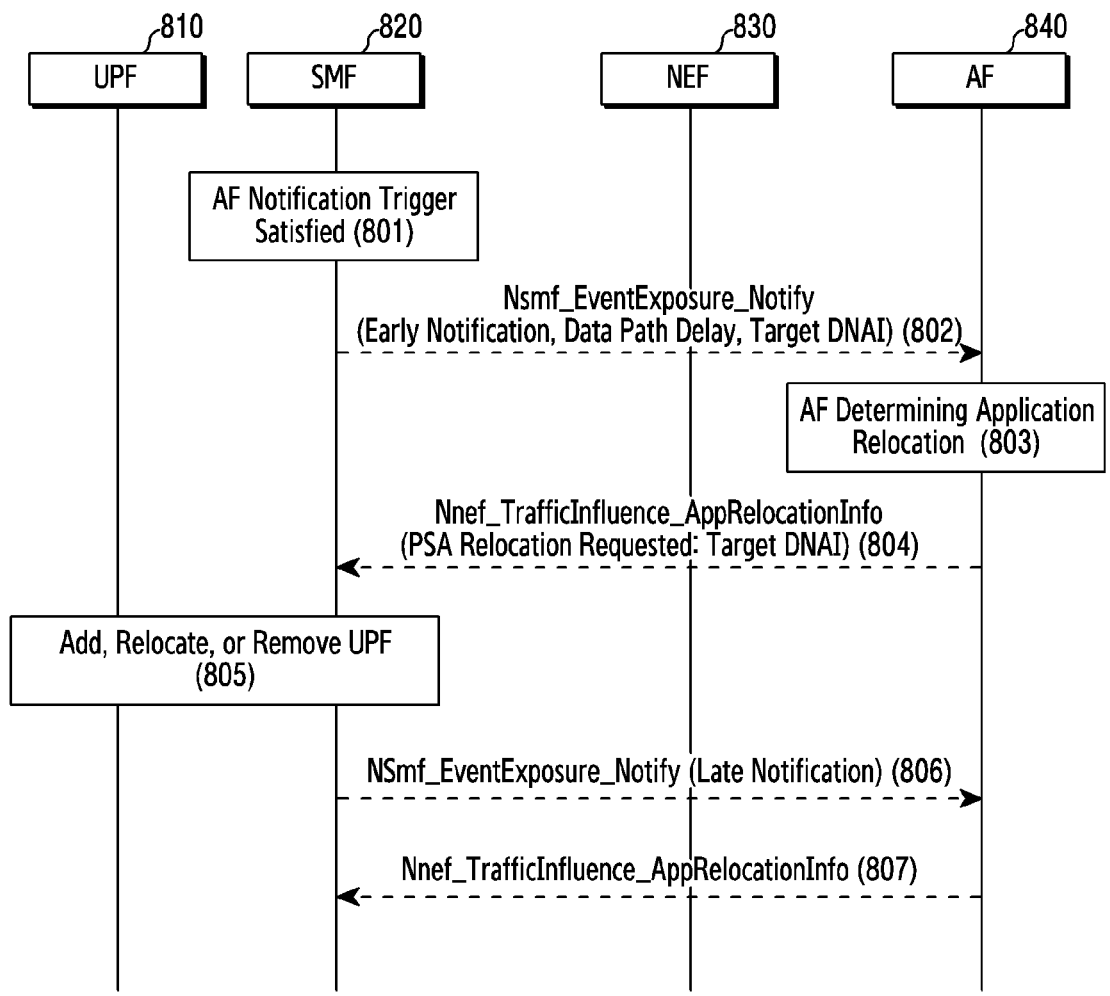
FIG. 8 is a view illustrating a procedure of notifying a UPF change event in a wireless communication system and a procedure of determining whether to relocate an application in an AF according to various embodiments of the disclosure.

FIG. 8 illustrates a procedure of notifying a UPF change event and a procedure of determining application relocation in an AF in a wireless communication system according to various embodiments of the disclosure.

At step 801, an SMF 820 determines that a condition of an AF notification trigger is satisfied.

At step 802, the SMF 820 transmits a Nsmf_EventExposure_Notify message to an AF 840. The message at step 802 may include at least one of information on an early notification, a data path latency, information of a target DNAI.

At step 803, the AF 840 which receives the early notification of step 802 from the SMF 820 determines application relocation. When determining the application relocation, the AF 840 considers a latency time regarding a data path that is directly received from the SMF 820 or is received via an NEF 830. If a network latency time estimated when application relocation to a target DNAI is performed does not satisfy a level that is required by the application, the AF 840 may not determine to perform application relocation to the target DNAI. If a latency time of a data path to a target PSA-UPF, which is reported from the SMF 820, satisfies the level that is required by the application, the AF 840 may determine to relocate the application.

At step 804, the AF 840 transmits a Nnet_TrafficInfluence_AppRelocationInfo message to the SMF 820. The message at step 804 may include at least one of information on whether PSA relocation is requested, information of the target DNAI. Specifically, if the AF 840 determines to relocate the application, the AF 840 transmits a request of PSA-UPF relocation to the target DNAI to the SMF 820. The request of the AF 840 may be transmitted through the NEF 830.

At step 805, the SMF 820 may add, relocate, or remove a UPF. Specifically, the SMF 820 which receives AF traffic influence application relocation information may determine to relocate the PSA-UPF to the target DNAI designated in the AF 840, and performs a procedure of UPF relocation.

At step 806, the SMF 820 transmits a NSmf_EventExposure_Notify message to the AF 840. The message at step 806 may include information on a late notification. Specifically, the SMF 820 which successfully performs PSA-UPF relocation transmits a notification message informing successful performance of the PSA-UPF relocation to the AF 840.

At step 807, the AF 840 transmits a Nnef_TrafficInfluence_AppRelocationInfo message to the SMF 820.

When an SMF event satisfying a UPF path change event subscription condition occurs, the SMF 820 which receives PCC rules from a PCF directly reports this to the AF 840 or reports through the NEF 830. When the AF influence request received from the AF 840 includes a request indicator of latency time information of a data path estimated for each target DNAI, the SMF 820 transmits, to the AF 840, information of a latency time estimated regarding a UPF path from a current terminal to a PSA-UPF indicated by the target DNAI. The SMF 820 may calculate the estimated latency time by itself, and may acquire information of the estimated latency time by inquiring a NWDAF.

Fifth Embodiment

In the fifth embodiment, a QoS monitoring procedure will be described with reference to FIG. 9.

Figure 9:
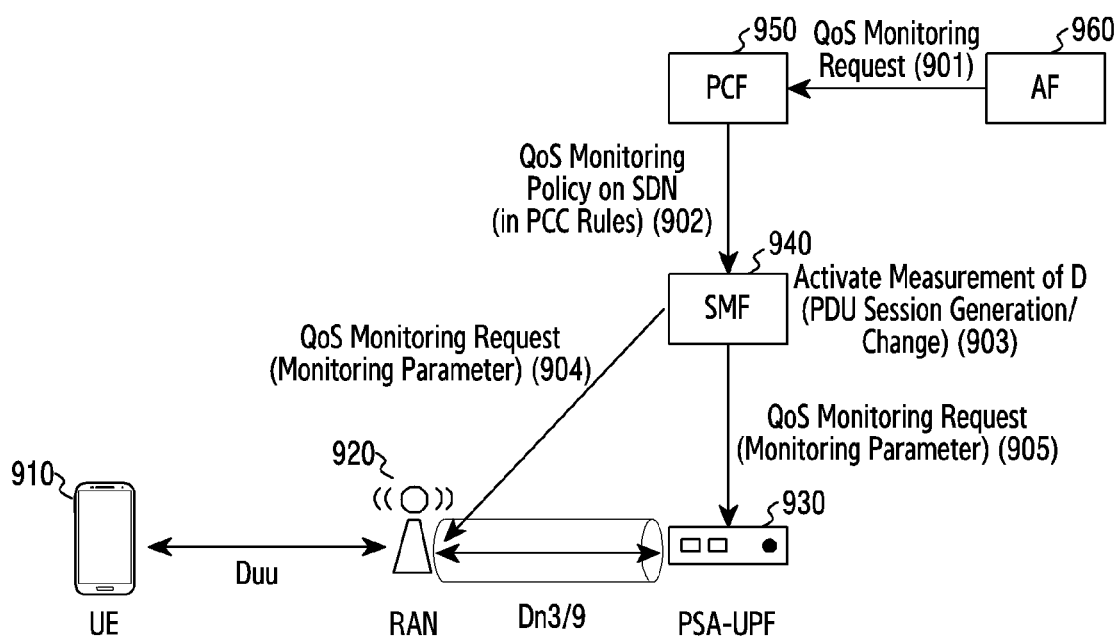
FIG. 9 is a view illustrating a QoS monitoring procedure in a wireless communication system according to various embodiments of the disclosure.

FIG. 9 illustrates a QoS monitoring procedure in a wireless communication system according to various embodiments of the disclosure.

The QoS monitoring procedure may be performed for each terminal or for each QoS flow provided by a terminal.

At step 901, an AF 960 transmits a QoS monitoring request message to a PCF 950.

At step 902, the PCF 950 generates a QoS monitoring policy approved for a service data flow based on the QoS monitoring request message received from the AF 960. The PCF 950 may include the generated QoS monitoring policy in PCC rules, and may transmit the same to an SMF 940. The QoS monitoring policy included in the PCC rules may include at least one piece of information of the following information:

(1) QoS monitoring target identifier;
(1-1) Terminal identifier, QoS flow identifier and PDU session identifier;
(2) QoS monitoring period or activation time;
(3) Measurement information for QoS monitoring; and
(3-1) Maximum transmission rate, average transmission rate, minimum transmission rate, transmission time;
(3-2) Relevant RAN node ID, UPF identification information;
(3-3) RAT type;
(3-4) Uu, N3, N9 section information;
(3-5) Transmission latency information: Unidirectional or bidirectional transmission latency information between a terminal-UPF or terminal and a PSA-UPF, UL and DL separate information, information of a node participating in a transmission latency; and
(3-6) Transmission latency information of each section.

At step 903, the SMF 940 activates measurement of a latency time D, and generates/changes a PDU session. Specifically, the SMF 940 initiates QoS measurement for each terminal or each QoS flow of a terminal for a QoS monitoring report after receiving the QoS monitoring policy.

At step 904, the SMF 940 transmits a QoS monitoring request message to a RAN 920. The QoS monitoring request message may include information of the QoS monitoring policy received from the PCF 950. For example, the QoS monitoring request message may include a monitoring parameter included in the QoS monitoring policy received by the SMF 940 from the PCF 950.

The RAN 920 which receives the QoS monitoring request message may measure QoS monitoring regarding uplink and downlink packets regarding a Uu interface with a terminal 910. The information measured by the RAN 920 may include at least one of a measuring period, a maximum, average, minimum transmission rate of an uplink packet. When the QoS monitoring request message includes a request for a latency time, the RAN 920 measures a latency time of uplink and downlink packets regarding the Uu interface. Latency times may be separately measured for uplink and downlink packets, and an RTT may be measured. The latency time may be measured multiple times.

The RAN 920 reports the latency of the uplink and downlink packets and a QoS monitoring result to a PSA-UPF 930 after measuring according to the QoS monitoring request. According to the QoS monitoring request, the RAN 920 may report the result of the QoS monitoring to the SMF 940.

At step 905, the SMF 940 transmits the QoS monitoring request message to the PSA-UPF 905. The QoS monitoring request message may include a monitoring parameter included in the approved QoS monitoring policy received by the SMF 940 from the PCF 950.

The PSA-UPF 930 which receives the QoS monitoring request message may measure a transmission latency of a packet by using a method of unidirectional packet latency monitoring measurement or bidirectional packet latency monitoring measurement. The unidirectional packet latency monitoring measurement and the bidirectional packet latency monitoring measurement will be described below with reference to FIGS. 10 and 11.

Figure 10:
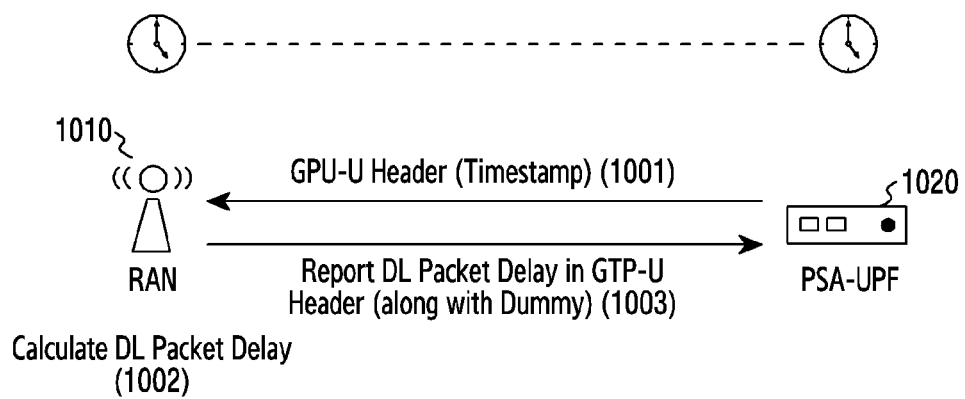
FIG. 10 is a view illustrating a unidirectional packet latency monitoring measurement method in a wireless communication system according to various embodiments of the disclosure.

FIG. 10 illustrates a unidirectional packet latency monitoring measurement method in a wireless communication system according to various embodiments of the disclosure.

Referring to FIG. 10, when a RAN 920 and a UPF 930 share an absolute time, unidirectional packet latency monitoring measurement may be performed by utilizing a timestamp.

At step 1001, a PSA-UPF 1020 transmits a general packet radio service (GPRS) tunnel protocol user-plane (GTP-U) header of a downlink packet to the RAN 1010. The GTP-U header may include timestamp information.

At step 1002, the RAN calculates a downlink packet latency. According to an embodiment, when the PSA-UPF 1020 calculates an uplink packet transmission latency, the PSA-UPF 1020 may calculate the uplink packet transmission latency by using a local time that is known through its own absolute time that the PSA-UPF 1020 has, and timestamp information included in the GTP-U header transmitted by the RAN 1010. According to an embodiment, when the RAN 1010 calculates a downlink packet transmission latency, the RAN 1020 may calculate the downlink packet transmission latency through a local time that is known through its own absolute time that the RAN 1020 has, and information of a timestamp included in the GTP-U header transmitted by the PSA-UPF 1020.

At step 1003, the RAN 1010 may include the result of measuring the downlink packet latency in the GTP-U header of the uplink packet, and may transmit the same to the PSA-UPF 1020. According to an embodiment, the RAN 1010 may transmit a dummy uplink packet without a payload to the PSA-UPF 1020 as a resulting packet of monitoring. The GTP-U header of the dummy uplink packet may include the result of measuring the downlink packet latency.

Figure 11:
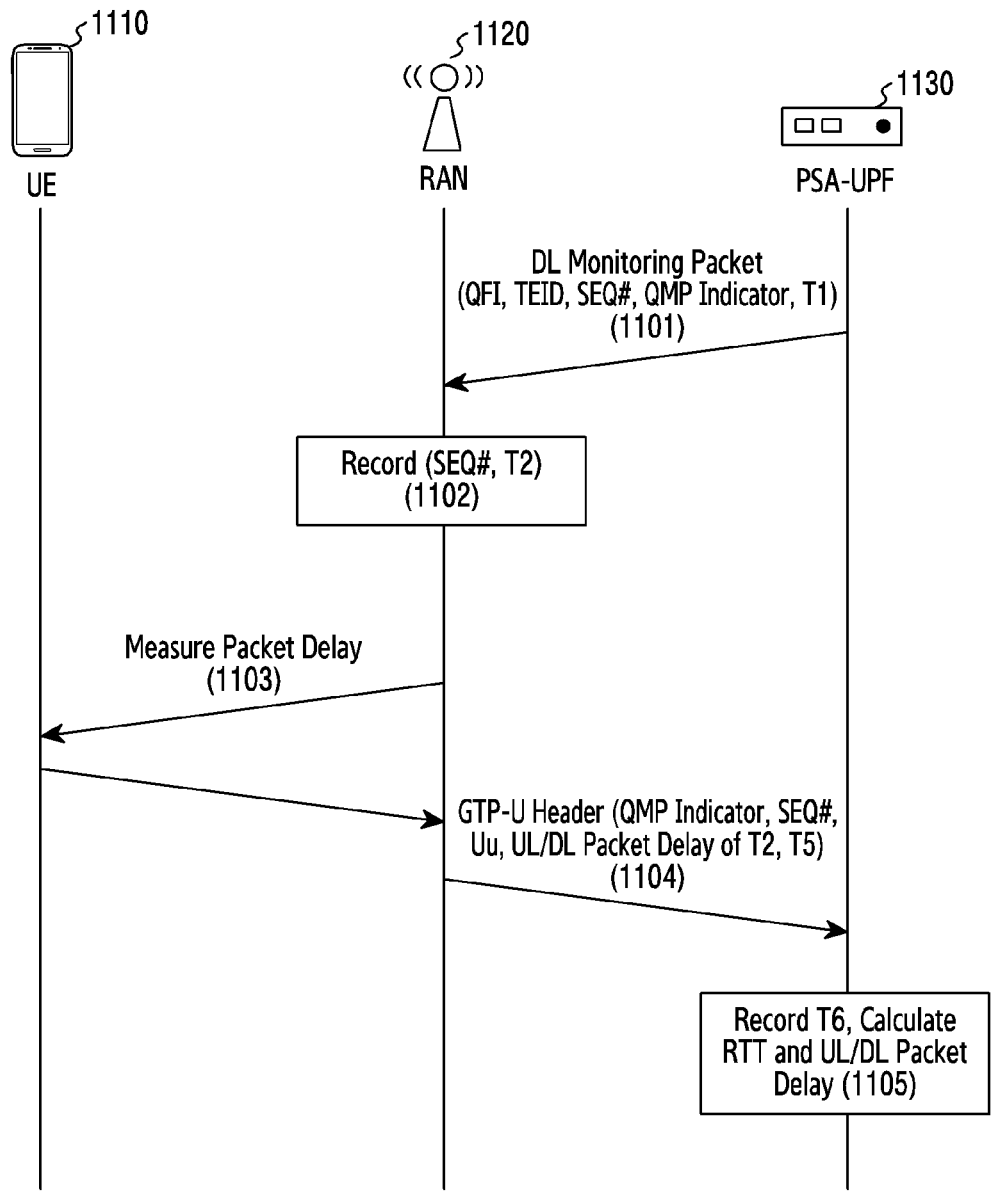
FIG. 11 is a view illustrating a bidirectional packet latency monitoring measurement method in a wireless communication system according to various embodiments of the disclosure.

FIG. 11 illustrates a bidirectional packet latency monitoring measurement method in a wireless communication system according to various embodiments of the disclosure.

Referring to FIG. 11, on the assumption that a RAN 1120 and a PSA-UPF 1130 have the same packet latency time, a latency time between the RAN 1120 and the PSA-UPF 1130 may be measured by using a round trip time (RTT).

At step 1101, the PSA-UPF 1130 transmits a downlink monitoring packet to the RAN 1120. A GTP-U header of the downlink monitoring packet at step 1101 includes a QoS flow identifier (QFI), a tunnel identifier (for example, a tunnel endpoint identifier (TEID)), a packet serial number (for example, sequence number, SEQ#), a QMP indicator (QoS management protocol identifier) and a currently measured local time (time 1, T1).

At step 1102, the RAN 1120 which receives the downlink monitoring packet records the packet serial number (for example, sequence number, SEQ#) and a current local time (time 2, T2).

At step 1103, the RAN 1120 performs measurement of a packet latency time regarding an Uu interface between a terminal 1110 and the RAN 1120.

At step 1104, the RAN which receives a monitoring packet response from the terminal transmits an uplink monitoring packet to the PSA-UPF 1130. A GTP-U header of the uplink monitoring packet at step 1104 includes a QoS management protocol (QMP) identifier, a corresponding packet sequence number (SEQ#), a transmission latency time of a Uu section, T2 and a local time (time 5, T5) at which the monitoring packet response is received from the terminal.

At step 1104, the PSA-UPF 1130 records a local time (time 6, T6) at which the uplink monitoring packet is received, and calculates a round trip time (RTT) between the RAN 1120 and the PSA-UPF 1130 by comparing with the transmission time of the corresponding downlink monitoring packet, which is identified by the QoS flow identifier (QFI), the tunnel identifier (for example, the tunnel endpoint identifier (TEM)), and the packet serial number (for example, sequence number, SEQ#).

When an event satisfying a QoS monitoring report condition received from an SMF occurs, the PSA-UPF 1130 reports occurrence of the corresponding event to the SMF. The QoS monitoring report condition may include at least one of the following conditions:

(1) Measurement period expiration: When a measurement period is given by the SMF, the event is reported to the SMF at the time when the measurement period expires after the measurement starts;

(2) Exceeding a threshold of a latency time: When threshold information on the measurement period is received from the SMF and a latency time exceeding the threshold information is measured, the event is reported;

(3) PDU session termination;

(4) QoS flow deletion;

(4-1) When an explicit QoS flow deletion procedure request occurs, the PSA-UPF 1130 reports measured QoS monitoring information to the SMF.

(5) QoS flow information change;

(5-1) When a base station is changed due to a handover of the terminal 1110, the PSA-UPF 1130 transmits statistical information collected from a previous base station and a tunnel to the SMF, (6) Deactivation of a PDU session;

(6-1) When UPF connection of the PDU session is deactivated, the PSA-UPF 1130 reports QoS monitoring information to the SMF, (7) Reception of a new QoS monitoring request: When a new QoS monitoring request is received for the same QoS flow, statistical information regarding QoS monitoring which has been previously measured is reported to the SMF.

Methods based on the claims or the embodiments disclosed in the disclosure may be implemented in hardware, software, or a combination of both.

When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in the disclosure.

The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the disclosure. In addition, an additional storage device on a communication network may access to a device which performs the embodiments of the disclosure.

In the above-described specific embodiments of the disclosure, elements included in the disclosure are expressed in singular or plural forms according to specific embodiments. However, singular or plural forms are appropriately selected according to suggested situations for convenience of explanation, and the disclosure is not limited to a single element or plural elements. An element which is expressed in a plural form may be configured in a singular form or an element which is expressed in a singular form may be configured in plural number.

While specific embodiments have been described in the detailed descriptions of the disclosure, it will be understood by those skilled in the art that various changes may be made therein without departing from the spirit and scope of the disclosure. Therefore, the scope of the disclosure should be defined not by the described embodiments but by the appended claims or the equivalents to the claims.

The disclosure generally relates to a wireless communication system, and more particularly, to an apparatus and a method for protocol data unit (PDU) session anchor-user plane function (PSA-UPF) relocation in a wireless communication system.

The invention claimed is:

1. A method performed by a session management function (SMF) entity in a mobile communication system, the method comprising:
receiving, from a policy control function (PCF) entity, an application function (AF) influenced traffic steering enforcement control information including data path latency requirement information, wherein the data path latency requirement information comprises a maximum allowed user plane latency; and
performing a protocol data unit (PDU) session anchor-user plane function (PSA-UPF) relocation with a PSA-UPF entity, wherein the PSA-UPF entity has a minimum user plane latency among at least one PSA-UPF entity satisfying the maximum allowed user plane latency.

2. The method of claim 1, wherein the minimum user plane latency is acquired from an estimated user plane latency between a user equipment (UE) and the at least one PSA-UPF entity satisfying the maximum allowed user plane latency.

3. The method of claim 1, wherein the AF influenced traffic steering enforcement control information is included in a policy and charging control (PCC) rule.

4. The method of claim 2, wherein the estimated user plane latency is identified based on information received from a network data analytic function (NWDAF) entity.

5. The method of claim 1, wherein the PSA-UPF relocation is triggered by an AF entity, and is requested to the SMF entity via a network exposure function (NEF) entity.

6. The method of claim 1, further comprising:
transmitting, to a network exposure function (NEF) entity, information for requesting relocation of application for an AF entity.

7. A session management function (SMF) entity in a mobile communication system, the SMF entity comprising:
a transceiver; and
at least one processor coupled with the transceiver and configured to:
receive, from a policy control function (PCF) entity, an application function (AF) influenced traffic steering enforcement control information including data path latency requirement information, wherein the data path latency requirement information comprises a maximum allowed user plane latency, and
perform a protocol data unit (PDU) session anchor-user plane function (PSA-UPF) relocation with a PSA-UPF entity, wherein the PSA-UPF entity has a minimum user plane latency among at least one PSA-UPF entity satisfying the maximum allowed user plane latency.

8. The SMF entity of claim 7, wherein the minimum user plane latency is acquired from an estimated user plane latency between a user equipment (UE) and the at least one PSA-UPF entity satisfying the maximum allowed user plane latency.

9. The SMF entity of claim 8, wherein the estimated user plane latency is identified based on information received from a network data analytic function (NWDAF) entity.

10. The SMF entity of claim 7, wherein the AF influenced traffic steering enforcement control information is included in a policy and charging control (PCC) rule.

11. The SMF entity of claim 7, wherein the PSA-UPF relocation is triggered by an AF entity, and is requested to the SMF entity via a network exposure function (NEF) entity.

12. The SMF entity of claim 7, wherein the processor is further configured to:
transmit, to a network exposure function (NEF) entity, information for requesting relocation of application for an AF entity.

* * * * *